(12) United States Patent
Meschenmoser et al.

(10) Patent No.: US 7,389,197 B2
(45) Date of Patent: Jun. 17, 2008

(54) DEVICE FOR PRODUCING MICROWAVE SIGNALS

(75) Inventors: Reinhard Meschenmoser, Hannover (DE); Bernhard Schwaderer, Weissach im Tal (DE); Wolfgang Ehrlinger, Aspach (DE)

(73) Assignee: Robert Bosch GmbH, Stuttgart (DE)

( * ) Notice: Subject to any disclaimer, the term of this patent is extended or adjusted under 35 U.S.C. 154(b) by 1034 days.

(21) Appl. No.: 10/465,967

(22) PCT Filed: Dec. 27, 2001

(86) PCT No.: PCT/DE01/04894

§ 371 (c)(1),
(2), (4) Date: Dec. 5, 2003

(87) PCT Pub. No.: WO02/054098

PCT Pub. Date: Jul. 11, 2002

(65) Prior Publication Data

US 2004/0070385 A1    Apr. 15, 2004

(30) Foreign Application Priority Data

Dec. 29, 2000    (DE) ............................ 100 65 721

(51) Int. Cl.
*G01P 7/00*    (2006.01)
*G01P 3/36*    (2006.01)

(52) U.S. Cl. ........................ 702/142; 356/28.5

(58) Field of Classification Search .......... 702/65, 702/74, 142, 149, 159; 356/28.5, 499
See application file for complete search history.

(56) References Cited

U.S. PATENT DOCUMENTS

| 4,216,474 A | 8/1980 | Levine |
| 4,948,257 A * | 8/1990 | Kaufman et al. ............ 356/521 |
| 5,216,478 A * | 6/1993 | Kadowaki et al. .......... 356/28.5 |
| 5,710,651 A | 1/1998 | Logan |
| 6,414,778 B1 * | 7/2002 | Hori ........................... 359/204 |

FOREIGN PATENT DOCUMENTS

| JP | 6259853 | 9/1994 |
| JP | 7104948 | 4/1995 |

OTHER PUBLICATIONS

R.-P. Braun and G. Großkopf, "Optical Millimeter-Wave Systems for Broadband Mobile Communication, Devices and Techniques", 1998 International Zürich Seminar on Broadband Communications-Accessing, Transmission, Networking, ETH Zürich, Switzerland, Feb. 17-19, 1998, IEEE Proceedings, pp. 51-58.

* cited by examiner

*Primary Examiner*—Bryan Bui
(74) *Attorney, Agent, or Firm*—Kenyon & Kenyon LLP

(57) ABSTRACT

A device for generating microwave signals, e.g., for use in a distance and speed sensor in a motor vehicle, is provided. To this end, two laser sources are operated, whose emitted radiations are distinguished from each other by a set difference in wavelength. The two lasers are arranged in such a manner that the emitted laser beams overlap spatially. A photodiode is arranged in this region in which the two laser beams interfere. From the superimposition product of the two laser beams, this photodiode generates an electrical output signal that has the differential frequency of the two superimposed laser beams. In this context, the frequency difference of the two lasers is selected so that the frequency of the generated microwave radiation lies in the range of the radar beam to be generated.

9 Claims, 1 Drawing Sheet

DEVICE FOR PRODUCING MICROWAVE SIGNALS

FIELD OF THE INVENTION

The present invention relates to a device for generating microwave signals, e.g., for use in a distance and speed sensor in a motor vehicle.

BACKGROUND INFORMATION

From the publication "*Optical Millimeter-Wave Systems for Broadband Mobile Communication, Devices and Techniques*" by R.-P. Braun and G. Großkopf, published at the "International Zurich Seminar of Broadband Communications-Accessing, Transmission, Networking" at the ETH Zürich in February 1998, it is known that microwave frequencies may be generated by the superimposition of optical waves of semiconductor lasers of different wavelength in a transmitter, modulated, and transmitted.

SUMMARY

The present invention provides a device for generating microwave signals, e.g., for use in a motor vehicle.

To this end, two laser sources are operated, whose emitted radiations are distinguished from each other by a set difference in wavelength. The two lasers are arranged in such a manner that the emitted laser beams superimpose spatially. A photodiode is disposed in this region in which the two laser beams interfere. From the superimposition product of the two laser beams, this photodiode generates an electrical output signal which has the beat frequency of the two superimposed laser beams. The difference in frequency between the two lasers is selected so that the frequency of the resulting beat lies in the range of the microwave signals.

The device according to the present invention may have a compact configuration and, due to this, may be used in applications in which microwave signals are generated in the tightest space.

Moreover, the microwave signals may be generated with the aid of the emitted radiation of the two lasers that irradiate a photodiode in common.

The difference in the beat frequency generated by the two lasers may lie in the range between 50 GHz and 100 GHz.

The two lasers may be operated in an injection-locking operation, in that the radiation of a further or a plurality of further laser sources is injected into the two lasers.

The laser sources, the photodiode, a high-frequency filter, the high-frequency amplifier, as well as other possible components may be monolithically integrated on a single substrate.

The device may be operated in a motor vehicle, e.g., as a microwave generator for a distance and speed sensor.

DETAILED DESCRIPTION

Figure 1:
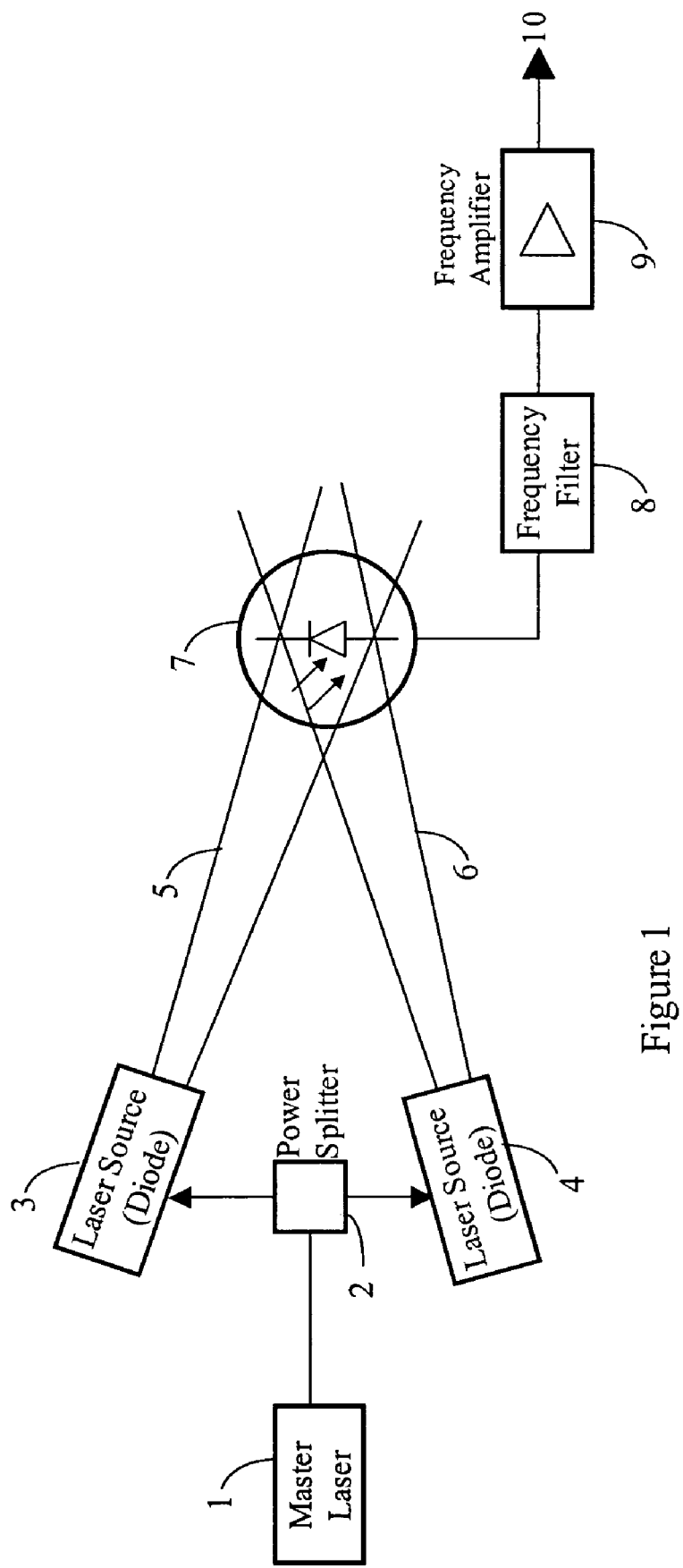
FIG. 1 shows a block diagram of an exemplary embodiment of the present invention.

FIG. 1 shows an exemplary embodiment of the device according to the present invention. Master laser 1 generates a frequency-stable output radiation. It is divided in a power splitter 2 into two sub-beams and supplied to two laser sources 3 and 4. The two laser sources 3, 4 may be implemented in the form of two laser diodes. At this point, it should be pointed out that according to the present invention, master laser 1 and power splitter 2 do not necessarily have to be present. If both laser sources 3, 4 emit a sufficiently frequency-stable output signal without master laser 1, then it is possible to dispense with master laser 1 and power splitter 2. In turn, these two laser sources 3, 4 each generate an output radiation 5 6.

The frequencies of the two output radiation beams 5, 6 of laser sources 3, 4 differ by the amount that is to be generated at the output of photodiode 7 as the frequency of the microwave signal to be generated. For example, if the microwave signal to be generated is to have a frequency of 76 gigahertz, then the frequencies of output radiations 5, 6 of the two laser sources 3, 4 differ by precisely this value, thus, by a frequency difference of 76 gigahertz, so that based on the mixing of the two beams 5, 6, which corresponds mathematically to a multiplication, due to the nonlinearity of photodiode 7, the desired microwave output frequency of 76 gigahertz results.

These two radiation beams 5, 6 of the two laser sources 3, 4 are aligned spatially so that a region exists in which the two radiation beams 5, 6 intersect. In this region of the superimposition, a photodiode 7 is placed which is irradiated by both radiation beams 5, 6 simultaneously. To that end, the photodiode is selected so that its band width permits detection of the differential frequency, but frequencies which are very much higher than the differential frequency may not be resolved.

Due to the nonlinearity of photodiode 7, resulting from the superimposed, optical input signal is an electrical output signal having the desired microwave frequency which has the frequency difference of the two radiation beams 5, 6. The output signal of this photodiode 7 is conducted via a high-frequency filter 8, which may take the form of a band-pass filter. This filter 8 allows only the microwave signals to pass which lie in the output frequency band which is desired and is to be generated. Substantially higher or lower frequencies are filtered out of the input signal of filter 8.

Finally, the microwave signal is amplified in a high-frequency amplifier 9 and fed to a further processing device 10. Further processing device 10 may be a device for transmitting and receiving microwave radiation.

According to the present invention, the described device made of electrical and optical components may also be produced on a single substrate as a monolithic semiconductor chip. Moreover, it is within the scope of the device of the present invention that this device is mounted in a housing which is provided for a speed and distance control in a motor vehicle, the device of the present invention being used as a frequency generator.

What is claimed is:

1. A device for generating microwave signals, comprising:
   a first laser diode;
   a second laser diode position relative to the first laser diode such that emitted laser beams of the first and second laser diodes overlap;
   a photodiode generating an electrical output signal based on the emitted laser beams;
   a frequency filter coupled to an output of the photodiode; and
   a high-frequency amplifier coupled to an output of the filter.

2. The device of claim 1, wherein the emitted radiations of the first laser diode and the second laser diode irradiate the photodiode.

3. The device of claim 1, wherein the first laser diode and the second laser diode emit radiations of different frequencies, and a frequency difference of the emitted radiations lies in a range between 50 GHz and 100 GHz.

4. The device of claim 1, further comprising:
a third laser source;
wherein emitted radiation of the third laser source is injected into the first laser diode and the second laser diode, whereby the third laser source, the first laser diode and the second laser diode operate in an injection-locking operation.

5. The device of claim 1, wherein the device is operated in a motor vehicle.

6. The device of claim 5, wherein the device is operated as a microwave generator for a distance and speed sensor.

7. The device of claim 1, wherein the first laser diode, the second laser diode, the photodiode, the high-frequency filter and the high-frequency amplifier are provided in a common housing.

8. The device of claim 7, wherein the common housing is a housing of a distance and speed sensor.

9. The device of claim 1, wherein the first laser diode, the second laser diode, the photodiode, the frequency filter and the high-frequency amplifier are integrated on a single substrate.

* * * * *